United States Patent
Kast

(10) Patent No.: US 9,817,216 B2
(45) Date of Patent: Nov. 14, 2017

(54) METHOD AND DEVICE FOR PRODUCING A PLURALITY OF MICROLENSES

(75) Inventor: Michael Kast, Wels (AT)

(73) Assignee: EV Group E. Thallner GmbH (AT)

( * ) Notice: Subject to any disclaimer, the term of this patent is extended or adjusted under 35 U.S.C. 154(b) by 345 days.

(21) Appl. No.: 14/399,327

(22) PCT Filed: May 30, 2012

(86) PCT No.: PCT/EP2012/060183
§ 371 (c)(1),
(2), (4) Date: Nov. 6, 2014

(87) PCT Pub. No.: WO2013/178263
PCT Pub. Date: Dec. 5, 2013

(65) Prior Publication Data
US 2015/0130095 A1 May 14, 2015

(51) Int. Cl.
*B29D 11/00* (2006.01)
*G02B 13/00* (2006.01)
(Continued)

(52) U.S. Cl.
CPC ........ *G02B 13/0085* (2013.01); *B29C 33/303* (2013.01); *B29C 37/005* (2013.01);
(Continued)

(58) Field of Classification Search
CPC ........ B29D 11/00365; B29D 11/00951; B29C 33/303; B29C 37/005; B29C 39/006; B29C 39/26; B29C 35/0888; G02B 13/0085
See application file for complete search history.

(56) References Cited

U.S. PATENT DOCUMENTS 4,076,780 A * 2/1978 Ditto .................... B29C 43/58
264/294
5,324,623 A 6/1994 Tsumori .................... 430/321
(Continued)

FOREIGN PATENT DOCUMENTS

CN      1743916 A    3/2006      ........... G02F 1/1335
EP      2251716 A1    11/2010      ............... G02B 3/00
(Continued)

OTHER PUBLICATIONS

International Search Report from corresponding International Patent Application No. PCT/EP2012/060183 (English-language translation provided).

*Primary Examiner* — Mathieu Vargot
(74) *Attorney, Agent, or Firm* — Kusner & Jaffe

(57) ABSTRACT

Device and method for producing a plurality of microlenses from a lens material. The method includes: applying lens material intended for the embossing of the microlenses to a plurality of first lens molds distributed on a first embossing side of a first die for embossing of the microlenses, moving the first die and a second die located essentially parallel, in an X-Y plane, and opposite the first die, on top of one another in a Z-direction running essentially perpendicular to the X-Y plane, embossing the microlenses by shaping and curing the lens material, the shaping taking place by moving the first and second embossing sides on top of one another, up to a thickness $D_1$ of the lens material in the Z-direction, wherein the lens material of each microlens at least during curing is separate from the lens material of each microlens which is adjacent in the X-Y plane.

31 Claims, 2 Drawing Sheets

(51) Int. Cl.
  *B29C 33/30*  (2006.01)
  *B29C 37/00*  (2006.01)
  *B29C 39/00*  (2006.01)
  *B29C 39/26*  (2006.01)
  B29C 35/08    (2006.01)
  B29L 11/00    (2006.01)

(52) U.S. Cl.
  CPC ............ *B29C 39/006* (2013.01); *B29C 39/26* (2013.01); *B29D 11/00365* (2013.01); *B29D 11/00951* (2013.01); B29C 35/0888 (2013.01); B29C 2035/0827 (2013.01); B29L 2011/0016 (2013.01)

(56) References Cited

U.S. PATENT DOCUMENTS

| | | | |
|---|---|---|---|
| 5,853,960 A | 12/1998 | Tran et al. | 430/321 |
| 5,871,888 A | 2/1999 | Heremans et al. | 430/321 |
| 6,846,137 B1 | 1/2005 | Border et al. | 409/163 |
| 6,872,334 B2 * | 3/2005 | Karita | B29C 39/10 264/1.38 |
| 7,372,631 B2 | 5/2008 | Ozawa | 359/619 |
| 8,540,906 B2 * | 9/2013 | Yoshida | B29C 33/3885 264/1.32 |
| 2006/0046486 A1 | 3/2006 | Ozawa | 438/689 |
| 2007/0029277 A1 | 2/2007 | Jacobowitz et al. | 216/24 |
| 2010/0270692 A1 * | 10/2010 | Yu | B29C 43/021 264/1.38 |
| 2011/0024030 A1 | 2/2011 | Rudmann et al. | 156/245 |
| 2012/0153518 A1 | 6/2012 | Fujii et al. | 264/2.5 |

FOREIGN PATENT DOCUMENTS

| | | | | |
|---|---|---|---|---|
| JP | H09-248782 A | 9/1997 | ............ | B25J 15/06 |
| JP | 2010-224118 A | 10/2010 | ............ | G02B 1/04 |
| JP | 2010-271465 A | 12/2010 | ............ | G02B 3/00 |
| JP | 2011-507727 A | 3/2011 | ............ | B29C 39/22 |
| WO | WO 2011/246630 A1 | 3/2011 | ............ | B29C 39/10 |
| WO | WO2012/055424 A1 | 5/2012 | ............ | B29C 33/20 |

* cited by examiner

METHOD AND DEVICE FOR PRODUCING A PLURALITY OF MICROLENSES

FIELD OF THE INVENTION

This invention relates to a method for producing a plurality of microlenses from a lens material. Furthermore, this invention relates to a device for producing a plurality of microlenses from a lens material.

BACKGROUND OF THE INVENTION

Microlenses are used primarily for devices which require an optical focusing apparatus, such as for example cameras of mobile phones. As a result of pressure to miniaturize, the functional areas are becoming smaller and smaller. The more microlenses are to be miniaturized, the more difficult their optically correct production becomes, because at the same time, there is enormous cost pressure for the microlenses which are ideally to be manufactured in mass production. In the prior art, microlenses are produced on a carrier substrate by different production methods, such as shown for example in U.S. Pat. No. 6,846,137 B1, U.S. Pat. No. 5,324,623, U.S. Pat. No. 5,853,960 and U.S. Pat. No. 5,871,888. It is common to all the aforementioned methods that, dictated by principle, a certain thickness is necessary and the light which passes through the microlens must pass not only through the lens, but the carrier substrate. Due to the simultaneously required high quality and demands for higher resolution with simultaneously higher brilliance which depends, among other items, on the thickness and the number of optics along the optical axis, therefore the beam path, further optimization of the microlenses is desirable.

The fidelity of shape of a microlens is especially important. This is defined as the microlens having to be the exact negative of the die. Very often the fidelity of shape of a microlens during the curing process of the microlens is not maintained since the microlens shrinks, and therefore a differential volume arises between the die and the microlens.

Another important property of a good microlens is the optical axis. The elimination of a wedge fault of the die relative to the carrier is especially important for a correct optical axis of the microlens, since in the presence of the wedge fault during embossing, the optical axis cannot be embossed exactly perpendicular to the carrier.

SUMMARY OF THE INVENTION

The object of this invention is to devise a device and a method with which microlenses can be produced in mass production and have high production precision, especially a very high fidelity to shape and an exactly aligned optical axis.

This object is achieved with the features of the independent claims. Advantageous developments of the invention are given in the dependent claims. All combinations of at least two of the features given in the specification, the claims and/or the figures also fall within the scope of the invention. At the given value ranges, values within the indicated limits will also be considered to be disclosed as boundary values and will be claimed in any combination.

The idea underlying the invention is to emboss and cure at the same time the plurality of microlenses (microlens field) produced in one method pass, and to also cure the individual microlenses spatially separate from one another. In this way, any faults produced by the embossing and curing are limited to the respective microlens so that the faults are not cumulative. Furthermore, this has the positive consequence that the separation step for separation of the microlenses from one another can be omitted. The separation takes place more or less as dictated by the system, especially by separate application or by spatial separation by means of the die.

The separation of the microlenses from one another is also the prerequisite for the active, force-regulated die control of the invention, which at first ensures the fidelity of shape of all microlenses. If the microlenses were not separated from another, when the microlenses cure and in the course of the shrinkage process which begins with this, the material would contract over the entire length of the wafer, and thus would produce shrinkage of varying intensity depending on the position. This shrinkage could not be compensated at least over the entire wafer.

The contour accuracy can be obtained if it is ensured that the die during the curing process actively, therefore in a controlled manner, continues the embossing process until it is ensured that a change in the shape of the microlens no longer occurs since the curing process has been completely terminated.

The following method steps of an embodiment of the present invention are provided especially in the following sequence:
application of the lens material which is intended for the embossing of the microlenses, especially a curable fluid, preferably polymer, in fluid form, to a plurality of first lens molds distributed on a first embossing side of a first die for embossing of the microlenses,
moving the first die and a second die located essentially parallel, specifically in an X-Y plane, and opposite the first die, on top of one another in a Z direction which runs essentially perpendicular to the X-Y plane,
recording an averaged force value from at least three actuators which control one of the two dies, at the start of the embossing process after complete filling of the die molds by the embossing material,
curing the lens material and simultaneous re-adjustment of the distance of the two dies to one another by further movement on top of one another so that the force value which has been determined at the start of curing remains the same or becomes at least greater during the curing process in order to ensure that any shrinkage of the lens material is compensated by movement of the dies on top of one another for all cases.

The device according to an embodiment of the present invention has in particular the following features:
a first die with first lens molds distributed on one embossing side of the first die,
a first receiving apparatus for accommodating the first die on one receiving side which faces away from the embossing side,
a second receiving apparatus for accommodating a second die on its receiving side which faces away from its embossing side,
application means for application of the lens material which is intended for embossing of the microlenses, especially a curable fluid, preferably polymer, in fluid form to the first lens molds,
embossing means for embossing of the microlenses by shaping and curing the lens material, the shaping taking place by movement of the first die and of the second die on top of one another, especially to a thickness $D_1$ of the lens material in the Z-direction, especially by means for position control of the first and second die relative to one another, there being measurement means for measuring an embossing force during embossing, by means of which the embossing, especially at least during the curing, can be influenced, especially by force control, preferably in addition to the position control.

As used herein, a die is defined as an element which comes into contact with the fluid which is to be cured and shapes it accordingly. In particular therefore also a simple planar wafer of Si, glass or another other material, even if it is not structured, can be regarded as a die.

The invention is characterized both according to the device and also the method especially in that the lens material of each microlens, at least during curing, is separate from the lens material of each microlens which is adjacent in the X-Y plane. The X-Y plane is especially defined by the first embossing side, one X-direction of the X-Y plane being perpendicular to one Y direction of the X-Y plane.

The control of the features of the invention takes place especially by a control apparatus which is assigned to the device, preferably which is integrated into it. The apparatus acquires signals from sensors or detection means which are provided according to the device and delivers corresponding control or adjustment signals to the elements of the device which carry out the method of the invention.

The integrated control apparatus preferably includes position controllers which can move at least one of the two dies so that movement of the two dies on top of one another, therefore a relative movement, is enabled. Furthermore, there are at least three force transducers which have been installed in the device such that the determination of the surface pressure and thus the surface force on the X-Y plane between the two dies is enabled.

The force is controlled especially such that, at least during the curing, a force control, especially in addition to the position control, takes place, the embossing force being made to compensate for a shrinkage of the lens material during curing. This is preferably effected by force control such that the embossing force remains the same during curing or increases according to an especially position-dependent and/or time-dependent control.

The shape of the microlenses is determined on the one hand by the first lens molds and on the other hand by the second die which can have second lens molds. The first lens molds are convexly or concavely curved, while the second die has in particular a planar embossing surface. The lens molds or dies thus form the negatives of the microlenses.

The lens material of the microlenses is arranged separately for each microlens especially from the application to the curing, preferably during the entire method. In other words, the lens material of the microlenses has in particular no direct connection among one another.

According to one advantageous embodiment of the invention, it is provided both according to the device and also according to the method that during curing, force-controlled and position-controlled approach of the two dies toward one another takes place so that possible shrinkages of the microlenses are compensated by recompressed material.

Alternatively or jointly with the preceding embodiment, according to one preferred approach during the curing and/or during the embossing an X-Y alignment of the first embossing side relative to the second embossing side takes place in the X-Y plane. For this purpose the device has in particular a receiving apparatus with a calibration table which is made to execute a translational, and in addition a rotational movement of the dies toward one another.

Alternatively or jointly with the preceding embodiments, according to one preferred approach, prior to curing and/or prior to embossing, a wedge fault compensation by wedge fault compensation means for parallel alignment of the embossing sides takes place. The wedge fault compensation means cause an exact and reproducible, exactly vertical position of the optical axis of each microlens of the plurality of microlenses.

In particular, the wedge fault compensation or the X-Y alignment or the Z-correction can take place continually after falling short of a certain value of a distance between the first embossing side and the second embossing side of the die. This is because it is especially advantageous to carry out the alignment, correction and/or wedge fault compensation shortly before the embossing or curing of the lens wafer and during the curing, since at this instant a minimum possible distance between the two opposite embossing sides is present so that with a position detection apparatus which is rigid to the embossing sides, an extremely accurate detection of the position of the embossing sides and thus of the position of the wafer and the die, is enabled. By detecting the position of the dies and the respective embossing sides to one another, exact control of the wedge fault compensation means and of the X-Y alignment means is possible. Accordingly, it is especially advantageous if the shaping takes place position-controlled and/or force-controlled according to one advantageous embodiment of the invention. Position detection by means of capacitive and/or inductive distance meters and/or optical devices such as interferometers could take place.

To the extent the dies have corresponding alignment marks for wedge fault compensation and/or for X-Y alignment, especially on their embossing side, preferably at least on one peripheral edge of the dies, a still more exact detection of the position of the embossing sides can be implemented and by the arrangement of the alignment marks on the embossing sides, especially integrated flush into the embossing sides, the distance between the alignment marks is as small as possible. In this way, the accuracy of position detection by detection means, especially in the form of optics, preferably microscopes, is substantially increased.

It is especially advantageous if the lens material is transparent to electromagnetic rays, especially to light, so that during the alignment the position detection takes place through the lens material, there being markings under the lenses. Hereinafter this is called in-liquid alignment and this measure yields a range of the depth of focus of position detection means, especially optics for detecting the position of the alignment marks and of the embossing sides of the dies, which range is enlarged by the index of refraction of the fluid as a multiplier.

As a consequence, it is advantageous if there are optical position detection means, especially optics, for wedge fault compensation and/or for X-Y alignment and/or for Z-correction, during the wedge fault compensation and/or the X-Y alignment and/or Z-correction both the embossing side of the first die or its alignment marks and also the embossing side of the second die or its alignment marks being located at the same time in the range of the depth of focus of the optical position detection means which are rigid especially to the die. Therefore, it is no longer necessary to shift the position detection means during the position detection or during the alignment and shaping so that the position detection means themselves have no effect on the relative position of the first die to the second die, and thus an additional fault source is precluded. In the prior art the problem arose that either a rigid position detection means with a larger range of the depth of focus or a movable position detection means with a smaller range of the depth of focus had to be used. This dilemma is resolved by the present invention.

By the distance between the embossing side (or the alignment marks) of the first die and the embossing side (or the alignment marks) of the second die in the Z-direction being greater than 0 and at the same time smaller than the range of the depth of focus in the Z-direction during position detection, the detection accuracy is improved and increased.

According to another configuration of the invention, it is advantageously provided according to the device and/or method that the application of the lens material takes place by application of droplets. For this purpose according to the device there are droplet application means, especially a droplet dispenser. With these droplet application means exact metering of the respective amount of the lens material for each microlens can be controlled. The control takes place especially via the control apparatus.

The separation of the lens material of each microlens of the microlens field takes place according to another advantageous embodiment of the invention by free spaces which at least partially, especially completely surround the first lens molds being provided for separation of the lens material of adjacent microlenses during curing. Thus the lens material of the microlenses is separated at least predominantly, preferably completely from one another in space.

To the extent a shrinkage of the microlenses during curing is compensated by the wedge fault compensation means and/or the X-Y alignment means and/or by Z-correction and/or the position detection means, the accuracy of the microlenses is again distinctly increased.

As an independent invention there is moreover a microlens field which is produced by the device and/or the method of the present invention and which consists of the following features:

a second die which is made especially as a flat substrate, preferably a wafer, with a plurality of microlenses which have been cured and embossed from the second die and which are located separate from one another on the second die.

In particular the second die, especially on the embossing side, preferably at least on one peripheral edge of the second die, has alignment marks for wedge fault compensation and/or for X-Y alignment and/or for Z-correction.

Preferably the adhesion between one of the two dies and the embossing material is greater than to the other die. This ensures that in removal of the lenses from the mold by removing one of the dies, the microlenses remain adhering only on one die. Preferably, the die on which the microlenses remain is the lower die.

The further processing of the lenses after shaping can take place in different ways.

One conceivable and preferred possibility is the use of a temporary carrier as the lower die on which the lenses are transported in order to be removed in a later process.

For example a flip-chip bonder could be used in order to accommodate the lenses and to place them on another wafer. The lenses could be stacked accordingly, provided with apertures, etc.

Another possibility includes using a transparent wafer as the lower die on which the microlenses remain permanently. In another step, cutting of the individual component regions can take place in order to obtain several individual microlenses with a corresponding "backbone" base.

Features disclosed according to the method should also be considered as disclosed according to the device and vice versa.

Other advantages, features and details of the invention will become apparent from the following description of preferred exemplary embodiments and drawings.

BRIEF DESCRIPTION OF THE DRAWINGS

In the figures advantages and features of the invention are labeled with the reference numbers which identify them according to embodiments of the invention, components or features with the same function or function with the same effect being labeled with identical reference numbers.

DETAILED DESCRIPTION OF PREFERRED EMBODIMENT

FIGS. 1a to 1e show a method sequence according to one embodiment of the invention for producing a plurality of microlenses 10 (see FIG. 1e) from a lens material, specifically a curable fluid 2, in this case a polymer.

Figure 1A:
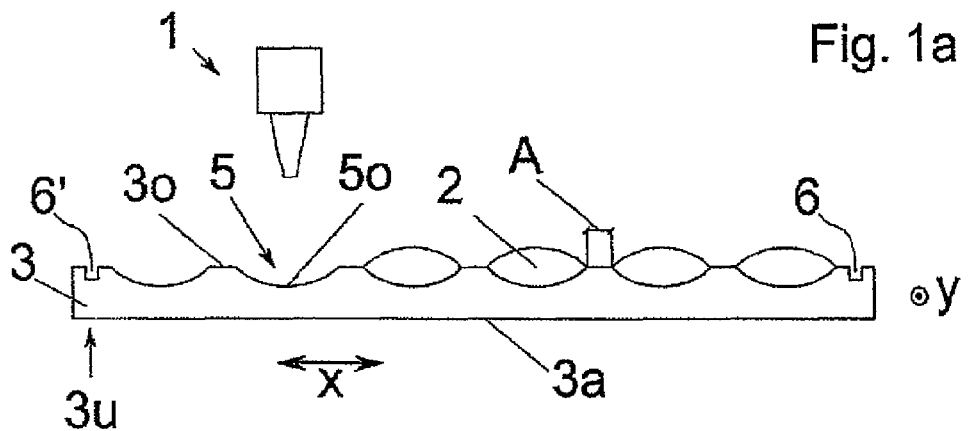
FIG. 1a shows a schematic, cut side view of a device in a first inventive method step of application of a lens material for producing inventive microlenses of a microlens field.

FIG. 1a shows a first method step in which a first die 3 is accommodated in a first receiving apparatus (not shown) for accommodating the first die 3 on a receiving side 3a thereof. The receiving side 3a faces away from a first embossing side 3o of the first die 3, which is intended for embossing the microlenses 10. The movement of the receiving apparatus and thus also of the first die 3 is controlled by a control apparatus (not shown).

In the first method step illustrated in FIG. 1a, the first embossing side 3o is arranged pointing upward, thereby enabling the curable fluid 2 to be applied on the first embossing side 3o by means of a droplet dispenser 1 by the weight of the curable fluid 2.

The application takes place in the fluid, uncured form to a plurality of first lens molds 5 which are distributed on the first embossing side 3o. Embossing surfaces 5o of the first lens molds 5 in the illustrated exemplary embodiment are shaped concavely as negatives for the microlenses 10 which are to be produced. The curable fluid 2 is applied separately for each microlens 10 to be produced to the respective first lens mold 5 by means of a droplet dispenser 1. The latter is controlled by the control apparatus and applies an exactly defined amount of the curable fluid 2 to each of the first lens molds 5.

Figure 1B:
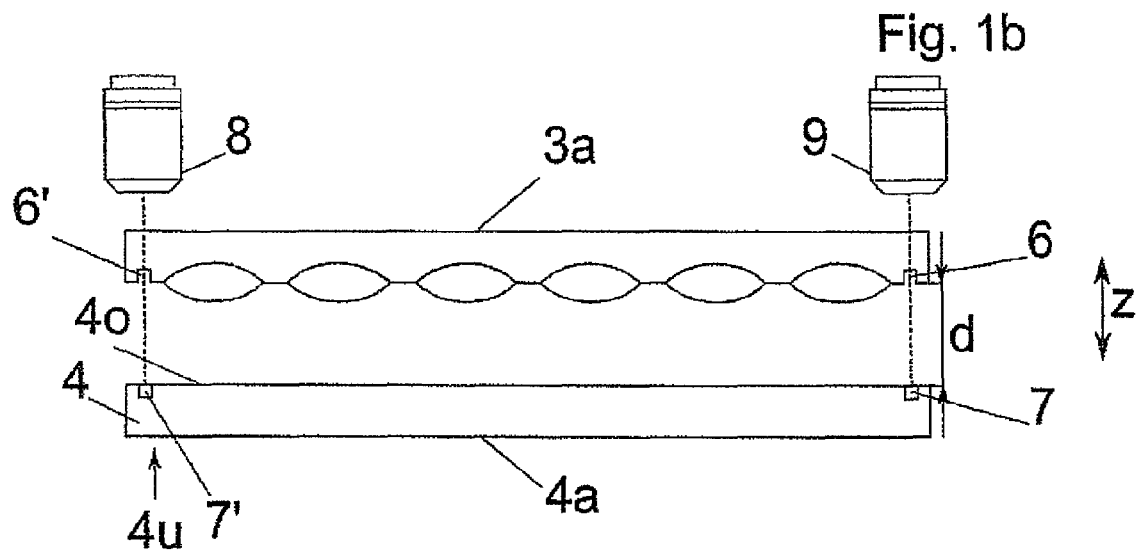
FIG. 1b shows a schematic of a method step of X-Y alignment by means of the position detection means.

In the subsequent method step which is shown in FIG. 1b, the first die 3 is turned by 180 degrees (flip) so that the receiving side 3a points up. This can take place for example by means of a robot arm which is used in particular also as a receiving apparatus. It is also conceivable that the die 3 is not turned and the die 4 approaches from the top.

The first die 3 is located opposite a second embossing side 4o of a second die 4, which side points up, and is aligned by means of corresponding first alignment marks 6, 6' of the first die 3 and second alignment marks 7, 7' of the second die 4.

The alignment marks 6, 6', 7, 7' are preferably located on one peripheral edge 3u, 4u of the first and second die 3, 4, preferably outside of a region covered by the lens molds 5.

For this purpose there are detection means in the form of two microscopes 8, 9 and alignment means for alignment of the first die 3 relative to the second die 4. The alignment means are able to align the first die 3 and/or the second die 4 in one X-direction, one Y-direction and one rotation direction and their angular position to the horizontal plane (X-Y plane). The alignment of the angular position takes place by wedge fault compensation means which provide for a preferably ideally parallel alignment of the embossing sides 3o, 4o. The control of the wedge fault compensation means and of the X-Y alignment means takes place by the control apparatus which acquires from the detection means and optionally other sensor values about the relative and/or absolute position of the first die 3 and of the second die 4.

The second die 4 is accommodated by a receiving apparatus (not shown). The first and the second receiving apparatus can be made especially as chucks with suction paths which fix the first and/or the second die 3 or 4. The first and/or second die 3, 4 can be made especially as wafers, the second die 4 in the illustrated exemplary embodiment having a planar embossing side 4o. The second embossing side 4o can also have second lens molds which are located at corresponding positions to the first lens molds 5 of the first die 3.

Movement of the first die 3 and the second die 4 towards one another takes place in one Z-direction. During the movement towards one another especially continuously another X-Y alignment and/or wedge fault compensation takes place.

Figure 1C:
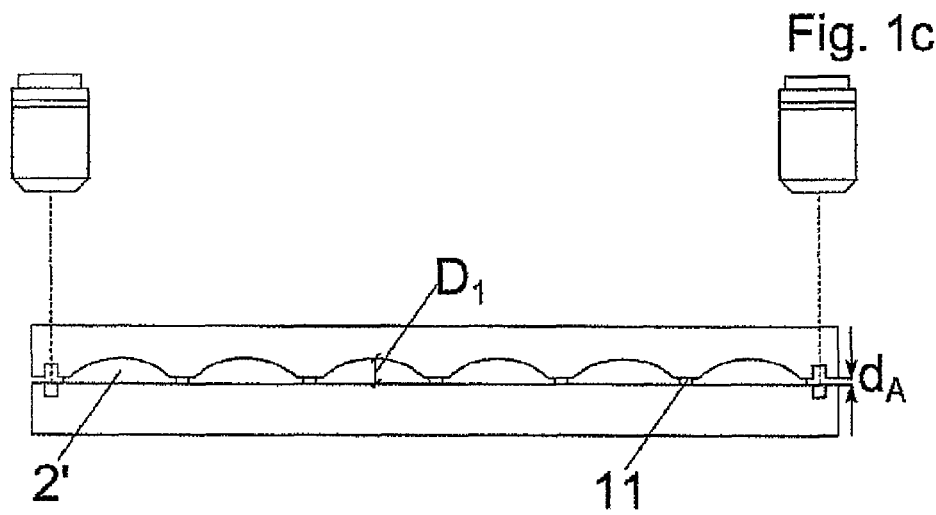
FIG. 1c shows a schematic of a method step of embossing by embossing means.

The movement towards one another takes place up to a thickness $D_1$ of the curable fluid 2, the detection of the thickness taking place preferably by measuring a distance $d_A$ between corresponding first and second alignment marks 6, 7 or 6', 7' or at other suitable sites on which the surfaces 4o, 3o of the dies are flat (see FIG. 1c).

Figure 1D:
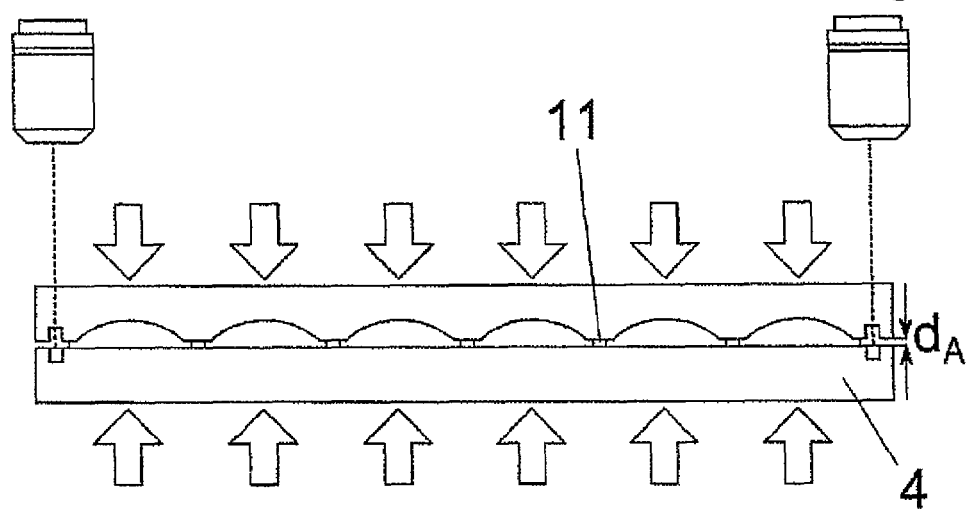
FIG. 1d shows a schematic of a method step of curing by curing means and FIG. 1e shows a schematic of a microlens field which has been embossed and cured.

In the method step which is shown in FIG. 1d the curable fluid 2 is cured by curing means (here in the form of UV rays) which pass through the first die 3 and/or the second die 4. During curing, the force and the position re-adjustment of the two dies to one another are measured so that the force remains the same or at least increases.

The curing can take place by any type of electromagnetic radiation, especially by UV light.

A thermal curing or another other type of curing would also be conceivable. The type of curing depends mostly on the material used and is known to anyone skilled in the art in the field.

In addition to the X-Y alignment and the wedge fault compensation at least shrinkage of the curable fluid 2 in the Z-direction, especially in addition shrinkage in the X- and Y-direction, is taken into account and a thickness $D_2$ of the microlenses 10 is set so that the microlenses 10 have perfect optical properties and no dents or faults produced by shrinkage are produced.

The thickness $D_1$ and $D_2$ corresponds especially to the maximum thickness of the lenses in the Z-direction.

As soon as curing is completed, the first die 3 is detached from the second die 4 and microlenses 10 which have been separated from one another remain on the second die 4. A mechanical separation after curing can be omitted.

Figure 1E:
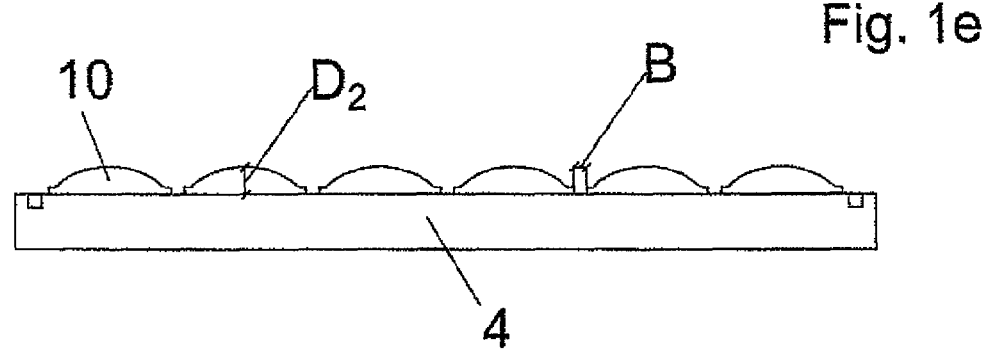

The separation takes place especially by a distance A between the embossing surfaces 5o which is dimensioned such that, after embossing and curing of the curable fluid 2 in the step shown in FIG. 1e, there is a distance B between the embossed and cured microlenses 10.

Thus, during the entire method sequence on the periphery of each microlens 10 and the curable fluid 2 provided for the microlenses 10 there is a free space 11 in which the curable fluid 2 can spread or shrink within certain limits. In this way, the region of the microlenses 10, which is decisive for the optics is not adversely affected by corresponding forming so that the microlens 10 after curing the curable fluid 2 at least in the middle region of the microlenses 10 which is decisive for the optics, has an optimum shape with an optical axis of each microlens 10, which axis is aligned perfectly in the Z-direction.

REFERENCE NUMBER LIST 1 droplet dispenser
2 curable fluid
3 first die
3a receiving side
3o first embossing side
3u peripheral edge
4 second die
4a receiving side
4o second embossing side
4u peripheral edge
5 first lens molds
5o embossing surface
6, 6' first alignment marks
7, 7' second alignment marks
8 microscope
9 microscope
10 microlenses
11 free spaces
A distance
B distance
$D_1$ (maximum) thickness
$D_2$ (maximum) thickness
X X-direction
Y Y-direction
Z Z-direction Having described the invention, the following is claimed:

1. A method for producing a plurality of microlenses from a lens material intended for the embossing of the microlenses, said method comprising:
   arranging a first embossing side of a first die to face upward, the first embossing side facing away from a receiving side of the first die,
   applying the lens material to a plurality of first lens molds distributed on the upwardly facing first embossing side of the first die,
   turning the first die by 180° such that the receiving side faces upward and the first embossing side faces a second die that is located opposite the first die and essentially parallel to the first die in an X-Y plane,
   moving the first die and/or the second die toward each other in a Z-direction that runs essentially perpendicular to the X-Y plane, said second die having a second embossing side,
   embossing the microlenses by shaping and curing of the lens material, the shaping taking place by moving the first and second embossing sides toward each other,
   measuring an embossing force during the embossing, and controlling the embossing according to the measured embossing force.

2. The method as claimed in claim 1, wherein the lens material of each microlens at least during curing is separate from the lens material of each microlens which is adjacent in the X-Y plane.

3. The method as claimed in claim 1, wherein during the curing and/or during the embossing an X-Y alignment of the first embossing side relative to the second embossing side takes place in the X-Y plane.

4. The method as claimed in claim 1, wherein the first die and the second die have alignment marks corresponding to one another for wedge fault compensation and/or for X-Y alignment.

5. The method as claimed in claim 1, wherein the lens material is applied by application of droplets.

6. The method as claimed in claim 1, wherein during curing free spaces at least partially surround the first lens molds for separation of the lens material of adjacent microlenses.

7. The method as claimed in claim 1, wherein said method further comprises compensating for shrinkage of the microlenses during curing.

8. A device for producing a plurality of microlenses from a lens material intended for embossing of the microlenses, said device comprising:
  a first die with first lens molds distributed on an embossing side of the first die,
  a first receiving apparatus for accommodating the first die on a receiving side of the first die that faces away from the embossing side, the first receiving apparatus comprising a robot arm configured to turn the first die by 180°,
  a second receiving apparatus for accommodating a second die on a receiving side of the second die which faces away from an embossing side of the second die,
  application means for application of the lens material to the first lens molds,
  embossing means for embossing of the microlenses by shaping and curing the lens material, the shaping taking place by movement of the first die and of the second die toward each other in a Z-direction,
  measurement means for measuring an embossing force during embossing, by means of which the embossing can be influenced, and
  control means by which the embossing means is controlled according to the measured embossing force.

9. The device as claimed in claim 8, wherein the lens material of each microlens can be applied by application means such that at least during curing it is separate from the lens material of each microlens which is adjacent in the X-Y plane.

10. The device as claimed in claim 8, wherein by X-Y alignment of the device during curing and/or during embossing an X-Y alignment of the embossing side of the first die relative to the embossing side of the second die can be carried out in one X-Y plane.

11. The device as claimed in claim 8, wherein first alignment marks of the first die are arranged corresponding to second alignment marks of the second die for wedge fault compensation and/or for X-Y alignment in the first die.

12. The device as claimed in claim 8, wherein the application means are made as droplet application means.

13. The device as claimed in claim 8, wherein the device has free spaces which at least partially surround the first lens molds for separation of the lens material of adjacent microlenses during curing.

14. The device as claimed in claim 8, wherein the device has compensation means for compensation of a shrinkage of the microlenses during curing.

15. A method as claimed in claim 1, wherein said lens material is a curable fluid.

16. A method as claimed in claim 15, wherein said curable fluid is a polymer in fluid form.

17. A method as claimed in claim 1, wherein said first die and said second die are moved in the Z-direction by position control.

18. A method as claimed in claim 1, wherein said embossing is controlled influenced at least during the curing of the lens material.

19. A method as claimed in claim 1, wherein the controlling of the embossing comprises controlling the embossing force.

20. A method as claimed in claim 4, wherein said alignment marks are located on the first and second embossing sides.

21. A method as claimed in claim 20, wherein said alignment marks are located on peripheral edges of the first and second embossing sides.

22. A method as claimed in claim 6, wherein said free spaces completely surround the first lens mold.

23. The device as claimed in claim 8, wherein said application means include a curable fluid.

24. The device as claimed in claim 23, wherein said curable fluid is a polymer in fluid form.

25. The device as claimed in claim 8, wherein said embossing means includes means for position control of the said first and second dies relative to each other.

26. The device as claimed in claim 8, wherein said control means is further configured to control said embossing means while said embossing means is curing said lens material.

27. The device as claimed in claim 8, wherein said control means is further configured to control said embossing force.

28. The device as claimed in claim 11, wherein said first alignment marks are located on the embossing side of the first die.

29. The device as claimed in claim 28, wherein said first alignment marks are located on at least one peripheral edge of the first die.

30. The device as claimed in claim 12, wherein said droplet application means is a droplet dispenser.

31. The device as claimed in claim 13, wherein said free spaces completely surround the first lens molds.

* * * * *